(12) United States Patent
Lee et al.

(10) Patent No.: US 11,766,913 B2
(45) Date of Patent: Sep. 26, 2023

(54) COUPLED TORSION BEAM AXLE BUSHING

(71) Applicants: HYUNDAI MOTOR COMPANY, Seoul (KR); KIA CORPORATION, Seoul (KR); DAEHEUNG R&T CO., LTD., Gimhae-si (KR)

(72) Inventors: Taehee Lee, Yongin-si (KR); Dae Un Sung, Incheon (KR); Jieun Song, Daejeon (KR); Jin Wook Park, Gimhae-si (KR)

(73) Assignees: HYUNDAI MOTOR COMPANY, Seoul (KR); KIA CORPORATION, Seoul (KR); DAEHEUNG R&T CO., LTD., Gimhae-si (KR)

( * ) Notice: Subject to any disclaimer, the term of this patent is extended or adjusted under 35 U.S.C. 154(b) by 0 days.

(21) Appl. No.: 17/884,637

(22) Filed: Aug. 10, 2022

(65) Prior Publication Data
US 2023/0049765 A1 Feb. 16, 2023

(30) Foreign Application Priority Data
Aug. 12, 2021 (KR) ........................ 10-2021-0106569

(51) Int. Cl.
*B60G 21/05* (2006.01)
*B60G 7/02* (2006.01)
*B60G 7/04* (2006.01)

(52) U.S. Cl.
CPC ............ *B60G 21/051* (2013.01); *B60G 7/02* (2013.01); *B60G 7/04* (2013.01); *B60G 2204/41* (2013.01); *B60G 2206/20* (2013.01)

(58) Field of Classification Search
CPC .... B60G 2204/4106; B60G 2204/4103; B60G 2204/41; B60G 21/051
See application file for complete search history.

(56) References Cited

U.S. PATENT DOCUMENTS

| 5,676,356 A | * | 10/1997 | Ekonen | ..................... F16F 1/40 |
| | | | | 267/141.1 |
| 6,729,611 B2 | * | 5/2004 | Deschaume | ......... B60G 21/052 |
| | | | | 267/141 |

(Continued)

FOREIGN PATENT DOCUMENTS

| CN | 1723149 A | * | 1/2006 | ......... B62D 55/0842 |
| CN | 113446341 B | * | 9/2022 | |

(Continued)

OTHER PUBLICATIONS

KR 20200065213 A machine translation from espacenet.com Jan. 2023.*

*Primary Examiner* — Paul N Dickson
*Assistant Examiner* — Maxwell L Meshaka
(74) *Attorney, Agent, or Firm* — LEMPIA SUMMERFIELD KATZ LLC

(57) ABSTRACT

A coupled torsion beam axle (CTBA) bushing is press-fitted into a bushing bracket provided at a tip of a trailing arm at each of two opposite sides of a CTBA suspension system. In particular, the CTBA bushing includes: an outer pipe including a through-hole formed therein; an inner pipe positioned in the through-hole; and a bushing rubber disposed in the through-hole and positioned between an outer peripheral surface of the inner pipe and an inner peripheral surface of the outer pipe, in which the bushing rubber includes: first compounds extending in a first direction, which is a diameter direction of the inner pipe, with the inner pipe interposed therebetween; and a second compounds integrated with the first compounds and extending in a second direction, which is perpendicular to the first direction, with the inner pipe interposed therebetween.

14 Claims, 10 Drawing Sheets

(56) References Cited

U.S. PATENT DOCUMENTS

| | | | |
|---|---|---|---|
| 10,577,024 B2 * | 3/2020 | Flickinger | F16F 1/3732 |
| 11,433,725 B2 * | 9/2022 | Sano | F16F 1/3863 |
| 11,453,262 B2 * | 9/2022 | Sung | F16F 1/3828 |
| 2002/0093170 A1 * | 7/2002 | Deschaume | B60G 21/052 |
| | | | 280/124.177 |
| 2019/0389513 A1 * | 12/2019 | Flickinger | F16F 15/08 |
| 2020/0108682 A1 * | 4/2020 | Sano | F16F 1/3842 |
| 2021/0138859 A1 * | 5/2021 | Sung | F16F 1/3828 |
| 2022/0332161 A1 * | 10/2022 | Dari | B60G 21/05 |

FOREIGN PATENT DOCUMENTS

| | | | | |
|---|---|---|---|---|
| DE | 202016100149 U1 * | 4/2016 | | B60G 21/055 |
| DE | 102016114737 A1 * | 2/2018 | | B60G 21/0551 |
| DE | 102019006967 A1 * | 4/2020 | | |
| KR | 101315678 B1 * | 10/2013 | | |
| KR | 20190005754 A * | 1/2019 | | |
| KR | 20200065213 A * | 6/2020 | | |
| KR | 20220083317 A * | 6/2022 | | |
| KR | 20220083318 A * | 6/2022 | | |
| WO | WO-2008119341 A1 * | 10/2008 | | B60G 7/001 |

* cited by examiner

COUPLED TORSION BEAM AXLE BUSHING

CROSS-REFERENCE TO RELATED APPLICATION

This application claims priority to and the benefit of Korean Patent Application No. 10-2021-0106569, filed in the Korean Intellectual Property Office on Aug. 12, 2021, the entire contents of which are incorporated herein by reference.

BACKGROUND

(a) Field

The present disclosure relates to a coupled torsion beam axle (CTBA) bushing.

(b) Description of the Related Art

In general, a CTBA bushing refers to a bushing used for a coupled torsion beam axle (CTBA) suspension system.

The CTBA bushing in the CTBA suspension system copes with behavior in an upward/downward direction, a forward/rearward direction, and a leftward/rightward direction of a vehicle.

The CTBA bushing in the related art is press-fitted into a bushing bracket provided at a tip of a trailing arm disposed at each of two opposite sides of the CTBA suspension system and includes an outer pipe, an inner pipe, and a bushing rubber positioned between an inner peripheral surface of the outer pipe and an outer peripheral surface of the inner pipe.

In the case of the CTBA bushing in the related art, the bushing rubber includes a compound having single hardness. For this reason, we have discovered that there is a problem in that it is difficult to optimally cope with behavior characteristics in the upward/downward direction, the forward/rearward direction, and the leftward/rightward direction of the vehicle.

The above information disclosed in this Background section is only for enhancement of understanding of the background of the present disclosure, and therefore it may contain information that does not form the prior art that is already known to a person of ordinary skill in the art.

SUMMARY

The present disclosure provides a coupled torsion beam axle (CTBA) bushing optimally coping with behavior characteristics of a vehicle in an upward/downward direction, a forward/rearward direction, and a leftward/rightward direction of the vehicle.

An embodiment of the present disclosure provides a CTBA bushing, which is press-fitted into a bushing bracket provided at a tip of a trailing arm at each of two opposite sides of the CTBA suspension system. In particular, the CTBA bushing includes: an outer pipe including a through-hole formed therein; an inner pipe positioned in the through-hole; and a bushing rubber disposed in the through-hole and positioned between an outer peripheral surface of the inner pipe and an inner peripheral surface of the outer pipe, in which the bushing rubber includes: first compounds extending in a first direction, which is a diameter direction of the inner pipe, with the inner pipe interposed therebetween; and a second compounds integrated with the first compounds and extending in a second direction, which is perpendicular to the first direction, with the inner pipe interposed therebetween.

The bushing rubber may further include a third compound positioned between the first compound and the second compound and made by mixing the first compound and the second compound.

The third compound may be integrated with the first compound and the second compound.

The third compound may extend in a direction perpendicular to a direction that intersects the first direction and the second direction.

The third compound may extend helically with respect to a direction that intersects the first direction and the second direction.

The third compound may extend while being inclined leftward with respect to a direction that intersects the first direction and the second direction.

The third compound may extend while being inclined rightward with respect to a direction that intersects the first direction and the second direction.

The first compound may have lower hardness than the second compound.

The first compounds and the second compounds may define a cross shape around the inner pipe.

The first compound may include a first sub-compound and a second sub-compound spaced apart from each other with the inner pipe interposed therebetween.

Hardness of the first sub-compound may be different from hardness of the second sub-compound.

The second compound may include a third sub-compound and a fourth sub-compound spaced apart from each other with the inner pipe interposed therebetween.

Hardness of the third sub-compound may be different from hardness of the fourth sub-compound.

One end of the bushing rubber may be exposed to the outside of the outer pipe, and the CTBA bushing may further include a side stopper positioned at one end of the bushing rubber.

Another exemplary embodiment of the present disclosure provides a CTBA bushing, which is press-fitted into a bushing bracket provided at a tip of a trailing arm at each of two opposite sides of the CTBA suspension system, the CTBA bushing including: an outer pipe including a through-hole formed therein; an inner pipe positioned in the through-hole; and a bushing rubber disposed in the through-hole and positioned between an outer peripheral surface of the inner pipe and an inner peripheral surface of the outer pipe, in which the bushing rubber includes a plurality of compounds extending in different directions.

The CTBA bushing provides advantages of optimally coping with behavior characteristics of the vehicle in the upward/downward direction, the forward/rearward direction, and the leftward/rightward direction of the vehicle.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings so that those with ordinary skill in the art to which the present disclosure pertains may easily carry out the embodiments. The present disclosure may be implemented in various different ways and is not limited to the embodiments described herein.

Throughout the specification, unless explicitly described to the contrary, the word "comprise/include" and variations such as "comprises/includes" or "comprising/including" should be understood to imply the inclusion of stated elements, not the exclusion of any other elements. When a component, device, element, or the like of the present disclosure is described as having a purpose or performing an operation, function, or the like, the component, device, or element should be considered herein as being "configured to" meet that purpose or to perform that operation or function.

Hereinafter, a CTBA bushing according to a first embodiment is described with reference to FIGS. 1 to 5.

Figure 1:
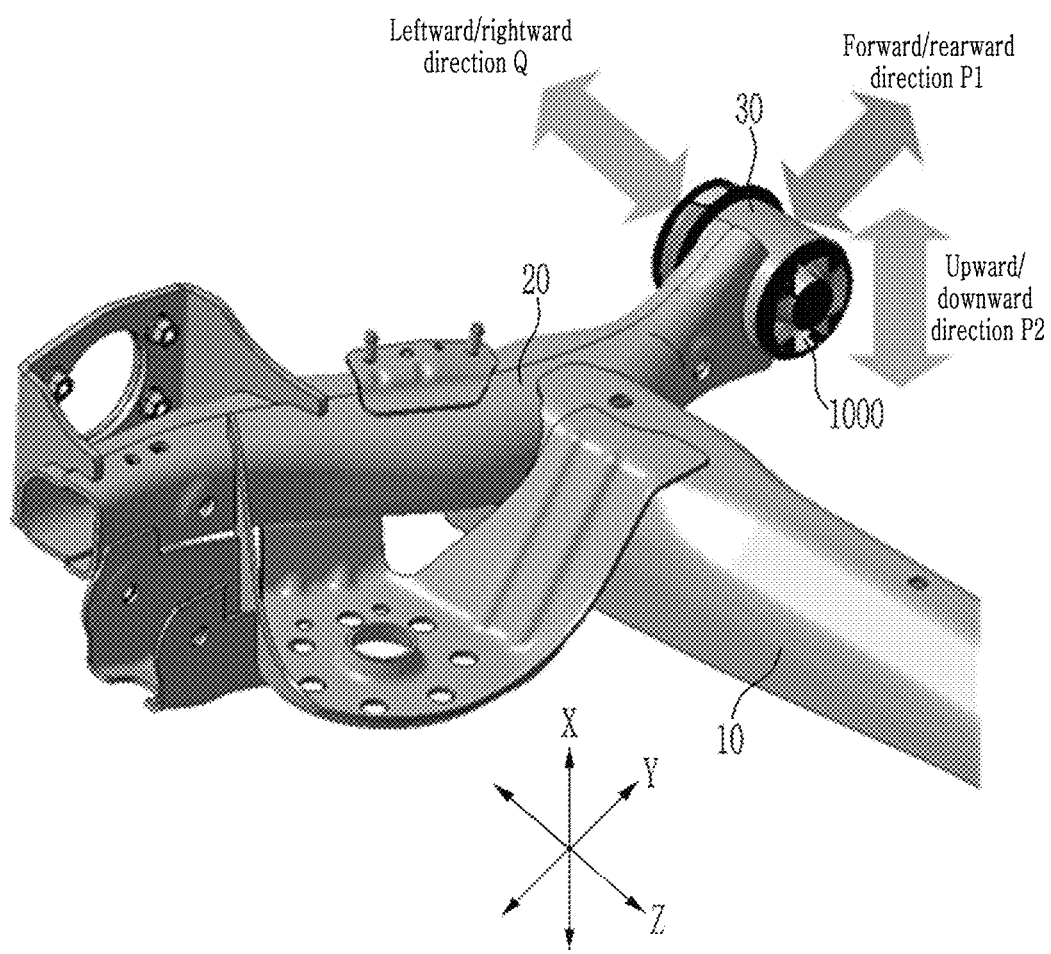
FIG. 1 is a view illustrating a state in which a CTBA bushing according to a first embodiment is mounted on a CTBA suspension system.

FIG. 1 is a view illustrating a state in which the CTBA bushing according to the first embodiment is mounted on a CTBA suspension system.

Referring to FIG. 1, a CTBA bushing 1000 according to the first embodiment is press-fitted into a bushing bracket 30 provided at a tip of a trailing arm 20 at each of two opposite sides of the CTBA suspension system 10.

In a CTBA suspension system 10, the CTBA bushing 1000 copes with behavior in a first direction X, which is an upward/downward direction P2 of a vehicle, a second direction Y, which is a forward/rearward direction P1 of the vehicle, and a third direction Z which is a leftward/rightward direction Q of the vehicle.

A bushing rubber of the CTBA bushing 1000 has hardness in the first direction X, which is the upward/downward direction P2 of the vehicle, lower than hardness in the second direction Y and the third direction Z in order to improve NVH (noise, vibration, and harshness) performance. The bushing rubber has hardness in the second direction Y, which is the forward/rearward direction P1 of the vehicle, higher than hardness in the first direction X and the third direction Z in order to improve ride quality performance. The bushing rubber has hardness in the third direction Z, which is between the hardness in the first direction X and the hardness in the second direction Y in order to improve R&H (ride and handling) performance.

In other words, in the CTBA suspension system 10, the CTBA bushing 1000 has different degrees of optimal hardness in the first direction X, the second direction Y, and the third direction Z in consideration of behavior characteristics in the first direction X, which is the upward/downward direction P2 of the vehicle, the second direction Y, which is the forward/rearward direction P1 of the vehicle, and the third direction Z in the leftward/rightward direction Q of the vehicle, thereby improving the NVH performance, the ride quality performance, and the R&H performance of the vehicle.

Figure 2:
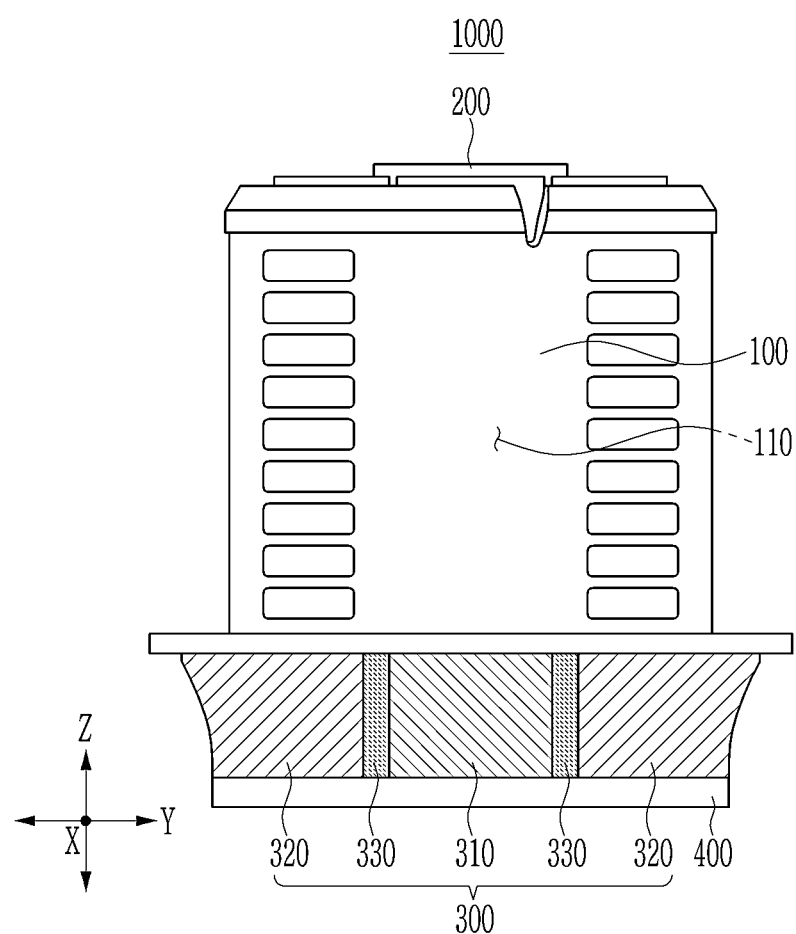
FIG. 2 is a side view illustrating the CTBA bushing according to the first embodiment.
Figure 3:
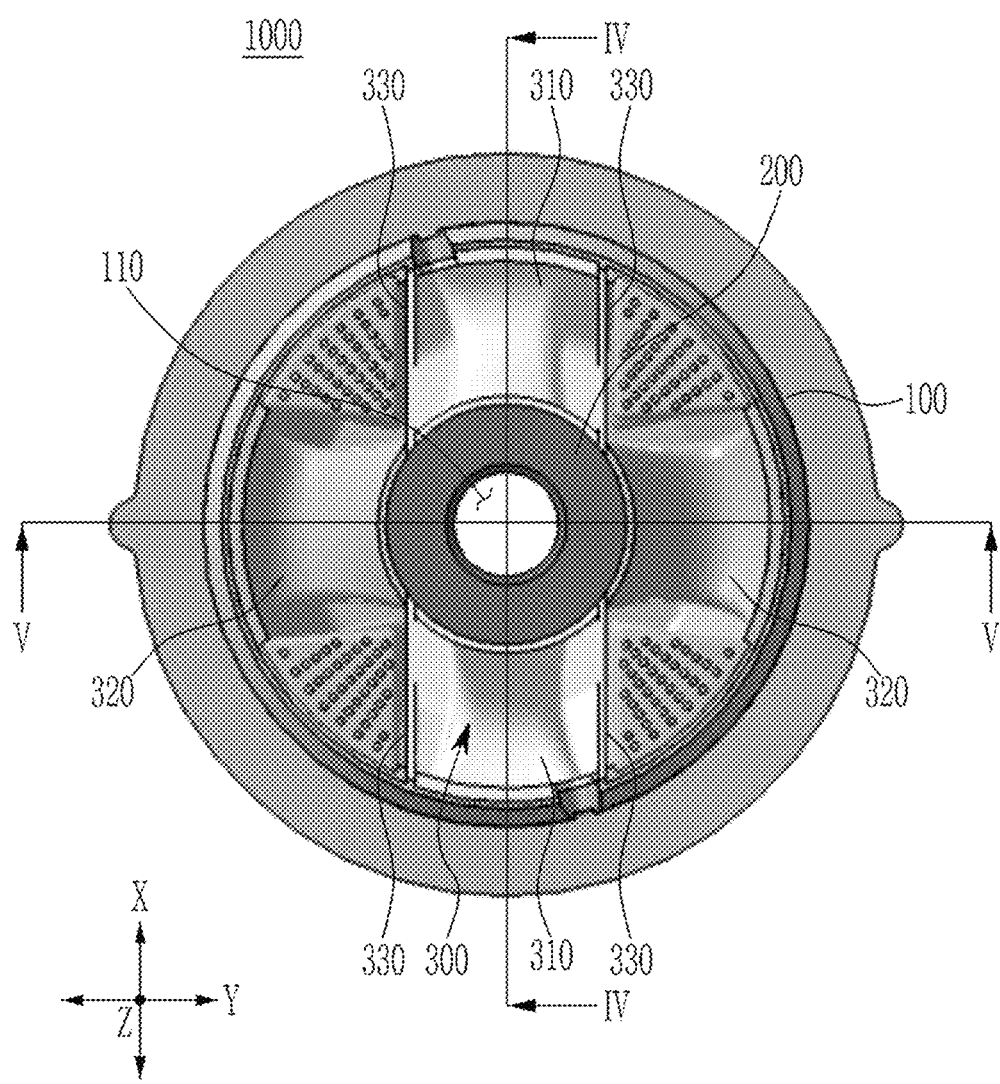
FIG. 3 is a top plan view illustrating the CTBA bushing according to the first embodiment.
Figure 4:
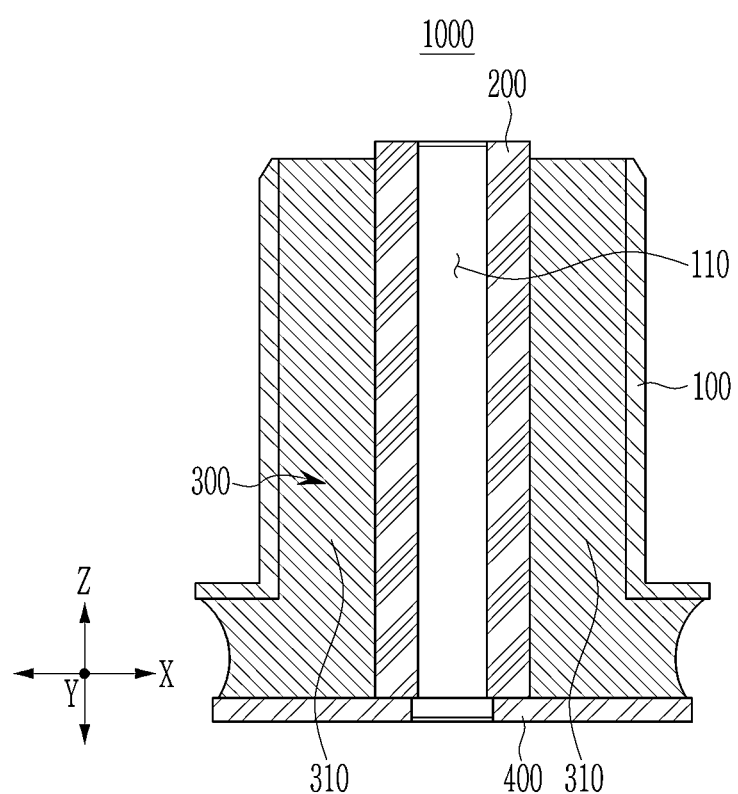
FIG. 4 is a cross-sectional view taken along line IV-IV in FIG. 3.
Figure 5:
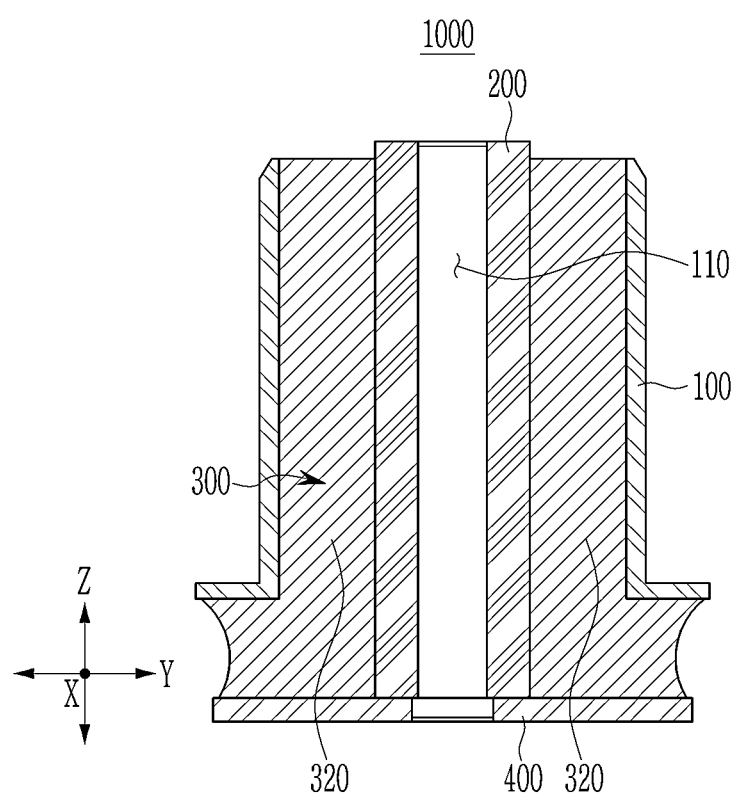
FIG. 5 is a cross-sectional view taken along line V-V in FIG. 3.

FIG. 2 is a side view illustrating the CTBA bushing according to the first embodiment. FIG. 3 is a top plan view illustrating the CTBA bushing according to the first embodiment. FIG. 4 is a cross-sectional view taken along line IV-IV in FIG. 3. FIG. 5 is a cross-sectional view taken along line V-V in FIG. 3.

Referring to FIGS. 2 to 5, the CTBA bushing 1000 includes an outer pipe 100, an inner pipe 200, a bushing rubber 300, and a side stopper 400.

The outer pipe 100 includes a through-hole 110 formed therein. The outer pipe 100 is press-fitted into the bushing bracket of the CTBA suspension system. The outer pipe 100 may have publicly-known various shapes.

The inner pipe 200 is positioned in the through-hole 110 of the outer pipe 100. The inner pipe 200 is connected to a vehicle body of the vehicle. The inner pipe 200 may have publicly-known various shapes.

The bushing rubber 300 is disposed in the through-hole 110 of the outer pipe 100 and positioned between an outer peripheral surface of the inner pipe 200 and an inner peripheral surface of the outer pipe 100. The bushing rubber 300 has elasticity. The bushing rubber 300 in the CTBA suspension system has different degrees of optimal hardness in the first, second and third directions (i.e., X, Y and Z directions), thereby improving the NVH performance, the ride quality performance, and the R&H performance of the vehicle. The first direction X is the upward/downward direction of the vehicle, the second direction Y is the forward/rearward direction of the vehicle, and the third direction Z is the leftward/rightward direction of the vehicle.

The bushing rubber 300 includes first compounds 310, second compounds 320, and third compounds 330 which are integrated with one another.

As illustrated in FIG. 3, the first compounds 310 extend in the first direction X, which is a diameter direction of the inner pipe 200, with the inner pipe 200 interposed therebetween. The first compound 310 is integrated with the second compound 320 and the third compound 330. The first compound 310 may be made of a different material from the second compound 320 and include publicly-known various types of rubber. The first compound 310 has lower hardness than the second compound 320. The first compound 310 has lower hardness than the second compound 320 and the third compound 330, and the first compound 310 in the CTBA suspension system provides a first elastic restoring force in the first direction X which is the upward/downward direction of the vehicle, thereby improving the NVH performance of the vehicle.

Meanwhile, in another embodiment, any one of the first compound 310 and the second compound 320 may have at least one of higher elasticity, higher durability, and higher heat resistance than the other compound.

As illustrated in FIG. 3, the second compounds 320 extend in the second direction Y, which is perpendicular to the first direction X, with the inner pipe 200 interposed therebetween. The second compound 320 is integrated with the first compound 310 and the third compound 330. The second compound 320 may be made of a different material from the first compound 310 and include publicly-known various types of rubber. The second compound 320 has higher hardness than the first compound 310. The second compound 320 has higher hardness than the first compound 310 and the third compound 330, and the second compound 320 in the CTBA suspension system provides a second elastic restoring force in the second direction Y which is the forward/rearward direction of the vehicle, thereby improving the ride quality performance of the vehicle.

As illustrated in FIG. 3, the second compounds 320 and the first compounds 310 define a cross shape around the inner pipe 200.

Meanwhile, in another embodiment, the second compounds 320 and the first compounds 310 may define, but not limited to, a radial shape around the inner pipe 200.

As illustrated in FIG. 2, the third compound 330 is positioned between the first compound 310 and the second compound 320. The third compound 330 is made by mixing the first compound 310 and the second compound 320. The third compound 330 is disposed between the first compound 310 and the second compound 320 and integrated with the first compound 310 and the second compound 320. The third compound 330 may be made of a mixture made by mixing the first compound 310 and the second compound 320 and include publicly-known various types of rubber. The third compound 330 may have a hardness between the hardness of the first compound 310 and the hardness of the second compound 320. As illustrated in FIG. 2, the third compound 330 extends in a direction perpendicular to the third direction Z that intersects the first direction X and the second direction Y. The hardness and a direction of the elastic restoring force of the third compound 330 may be variously adjusted by adjusting a mixing percentage of the first compound 310 and the second compound 320 and a direction in which the third compound 330 extends between the first compound 310 and the second compound 320. The third compound 330 is made by mixing the first compound 310 and the second compound 320 and thus has hardness between the hardness of the first compound 310 and the hardness of the second compound 320, such that the third compound 330 in the CTBA suspension system provides a third elastic restoring force in the third direction Z which is the leftward/rightward direction of the vehicle, thereby improving the R&H performance of the vehicle.

In the bushing rubber 300 including the first compound 310, the second compound 320, and the third compound 330, the first compound 310 includes a first rubber material having a first hardness, the second compound 320 includes a second rubber material having a second hardness higher than the first hardness, and the third compound 330 includes a mixture of the first rubber material and the second rubber material and having a third hardness set between the first hardness and the second hardness. The first compound 310, second compound 320 and third compound 330 may be integrated by injecting the first rubber material constituting the first compound 310 into one position corresponding to the first compound 310 in a single mold having a shape of the bushing rubber and simultaneously injecting the second rubber material constituting the second compound 320 into the other position corresponding to the second compound 320. In this case, since the first compounds 310 and the second compounds 320 define a cross shape, the mold may be easily separated from the bushing rubber 300.

The bushing rubber 300 is not limited to the structure illustrated in FIGS. 2 to 5 and may have publicly-known various structures corresponding to the structure of the vehicle and the structure of the CTBA suspension system as long as the bushing rubber 300 includes the first compound 310, the second compound 320, and the third compound 330 which are integrated. For example, the bushing rubber 300 may include open or closed holes having various shapes and formed inside or outside, depressed or protruding portions having various shapes, insertion substances having various shapes, and the like.

One end of the bushing rubber 300 may be exposed to the outside of the outer pipe 100, but the present disclosure is not limited thereto. One end of the bushing rubber 300 may be positioned in the outer pipe 100.

Meanwhile, in another embodiment, the bushing rubber 300 may include a plurality of compounds extending in different directions. For example, the plurality of compounds may include, but not limited to, two to twenty compounds.

The side stopper 400 is positioned at one end of the bushing rubber 300 that is exposed to the outside of the outer pipe 100. The side stopper 400 may inhibit or prevent the bushing rubber 300 from separating from the outer pipe 100 or the inner pipe 200, but the present disclosure is not limited thereto.

As described above, the CTBA bushing 1000 according to the first embodiment includes the first compound 310, the second compound 320, and the third compound 330 which are integrated with one another. Therefore, the CTBA bushing 1000 in the CTBA suspension system provides the first elastic restoring force corresponding to the first hardness of the first compound 310 in the first direction X which is the upward/downward direction of the vehicle, provides the second elastic restoring force corresponding to the second hardness of the second compound 320 in the second direction Y which is the forward/rearward direction of the vehicle, and provides the third elastic restoring force corresponding to the third hardness of the third compound 330 in the third direction Z which is the leftward/rightward direction of the vehicle, thereby improving the NVH performance, the ride quality performance, and the R&H performance of the vehicle in consideration of behavior characteristics in the upward/downward direction, the forward/rearward direction, and the leftward/rightward direction of the vehicle.

In other words, the present disclosure provides the CTBA bushing 1000 that optimally copes with the behavior characteristics of the vehicle in the upward/downward direction, the forward/rearward direction, and the leftward/rightward direction of the vehicle.

Hereinafter, CTBA bushings according to second to sixth embodiments is described with reference to FIGS. 6 to 10. Hereinafter, the parts different from the parts of the CTBA bushing according to the first embodiment are described.

Figure 6:
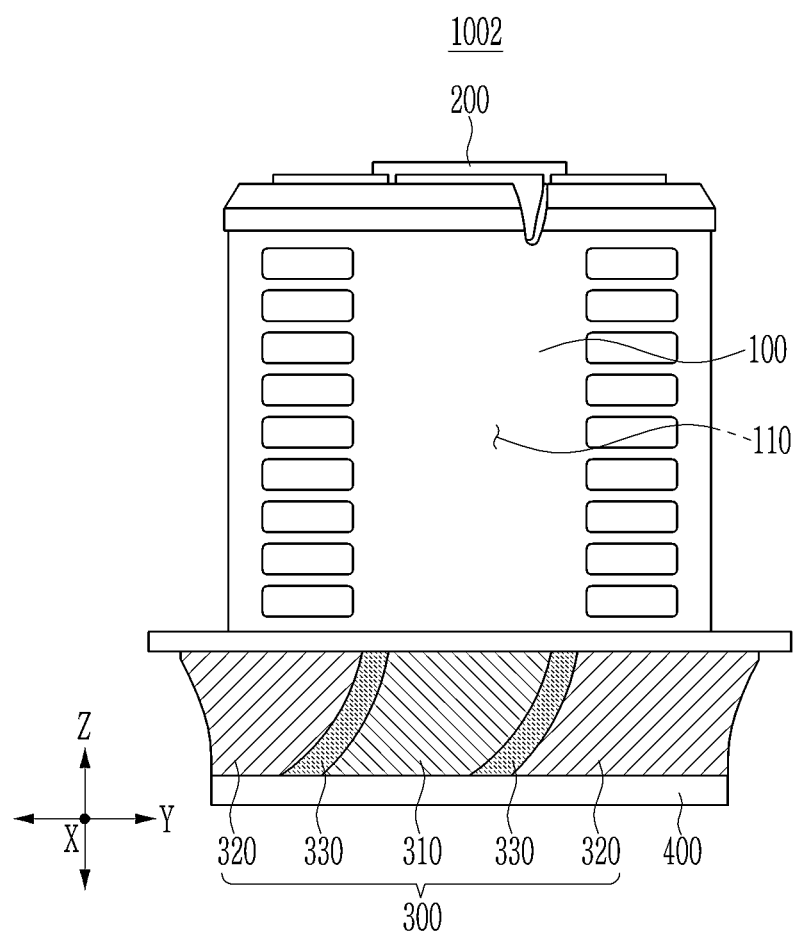
FIG. 6 is a side view illustrating a CTBA bushing according to a second embodiment.

FIG. 6 is a side view illustrating the CTBA bushing according to the second embodiment.

Referring to FIG. 6, a bushing rubber 300 of a CTBA bushing 1002 according to the second embodiment includes a first compound 310, second compounds 320, and third compounds 330.

The third compound 330 is positioned between the first compound 310 and the second compound 320. The third compound 330 is made by mixing the first compound 310 and the second compound 320. The third compound 330 is disposed between the first compound 310 and the second compound 320 and integrated with the first compound 310 and the second compound 320. The third compound 330 may be made of a mixture made by mixing the first compound 310 and the second compound 320 and include publicly-known various types of rubber. The third compound 330 may have a hardness set between the hardness of the first compound 310 and the hardness of the second compound 320. The third compound 330 extends in a helical or swirl shape in the third direction Z that intersects the first direction X and the second direction Y. The direction of hardness and elastic restoring force of the third compound 330 is adjusted by adjusting a direction in which the third compound 330 extends between the first compound 310 and the second compound 320. The direction of hardness and elastic restoring force of the third compound 330 is adjusted to the third direction Z by adjusting the direction in which the third compound 330 extends between the first compound 310 and the second compound 320, and thus the CTBA bushing in the CTBA suspension system provides an elastic restoring force optimally adjusted in the third direction Z which is the leftward/rightward direction of the vehicle, thereby improving the R&H performance of the vehicle.

Meanwhile, in another embodiment, the third compound 330 may extend as a divided structure in the third direction Z that intersects the first direction X and the second direction Y.

A lower plate of a single mold having a shape of the bushing rubber includes a protruding portion of a swirl structure corresponding to the helical or swirl shape of the third compound 330. Therefore, the third compound 330 may extend in the helical or swirl shape in the third direction Z while corresponding to the lower plate of the mold when the first rubber material of the first compound 310 and the second rubber material of the second compound 320 are mixed.

As described above, the present disclosure provides the CTBA bushing 1002 that optimally copes with the behavior characteristics of the vehicle in the upward/downward direction, the forward/rearward direction, and the leftward/rightward direction of the vehicle.

Figure 7:
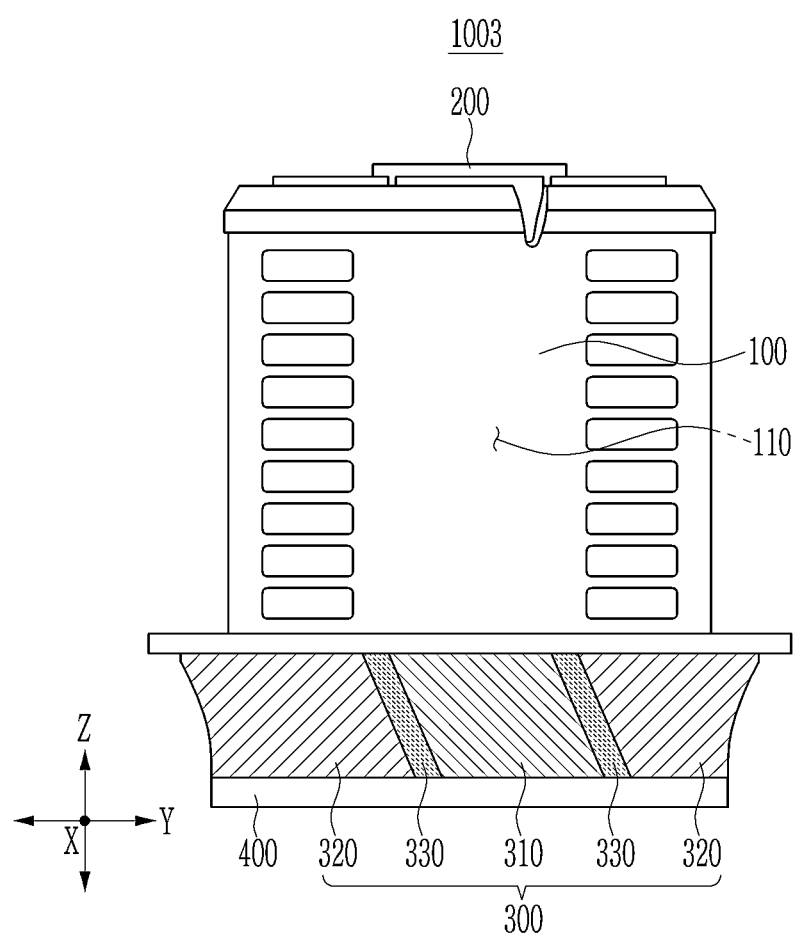
FIG. 7 is a side view illustrating a CTBA bushing according to a third embodiment.

FIG. 7 is a side view illustrating the CTBA bushing according to the third embodiment.

Referring to FIG. 7, a bushing rubber 300 of a CTBA bushing 1003 according to the third embodiment includes a first compound 310, second compounds 320, and third compounds 330.

The third compound 330 is positioned between the first compound 310 and the second compound 320. The third compound 330 is made by mixing the first compound 310 and the second compound 320. The third compound 330 is disposed between the first compound 310 and the second compound 320 and integrated with the first compound 310 and the second compound 320. The third compound 330 may be made of a mixture made by mixing the first compound 310 and the second compound 320 and include publicly-known various types of rubber. The third compound 330 may have a hardness set between the hardness of the first compound 310 and the hardness of the second compound 320. The third compound 330 extends while being inclined leftward with respect to the third direction Z that intersects the first direction X and the second direction Y. The direction of hardness and elastic restoring force of the third compound 330 is adjusted by adjusting a direction in which the third compound 330 extends between the first compound 310 and the second compound 320. The direction of hardness and elastic restoring force of the third compound 330 is adjusted to the third direction Z by adjusting the direction in which the third compound 330 extends between the first compound 310 and the second compound 320, and thus the CTBA bushing in the CTBA suspension system provides an elastic restoring force optimally adjusted in the third direction Z which is the leftward/rightward direction of the vehicle, thereby improving the R&H performance of the vehicle.

A lower plate of a single mold having a shape of the bushing rubber includes a protruding portion of a leftward structure, such that the third compound 330 may extend while being inclined leftward in the third direction Z while corresponding to the lower plate of the mold when the first rubber material of the first compound 310 and the second rubber material of the second compound 320 are mixed.

As described above, the present disclosure provides the CTBA bushing 1003 that optimally copes with the behavior characteristics of the vehicle in the upward/downward direction, the forward/rearward direction, and the leftward/rightward direction of the vehicle.

Figure 8:
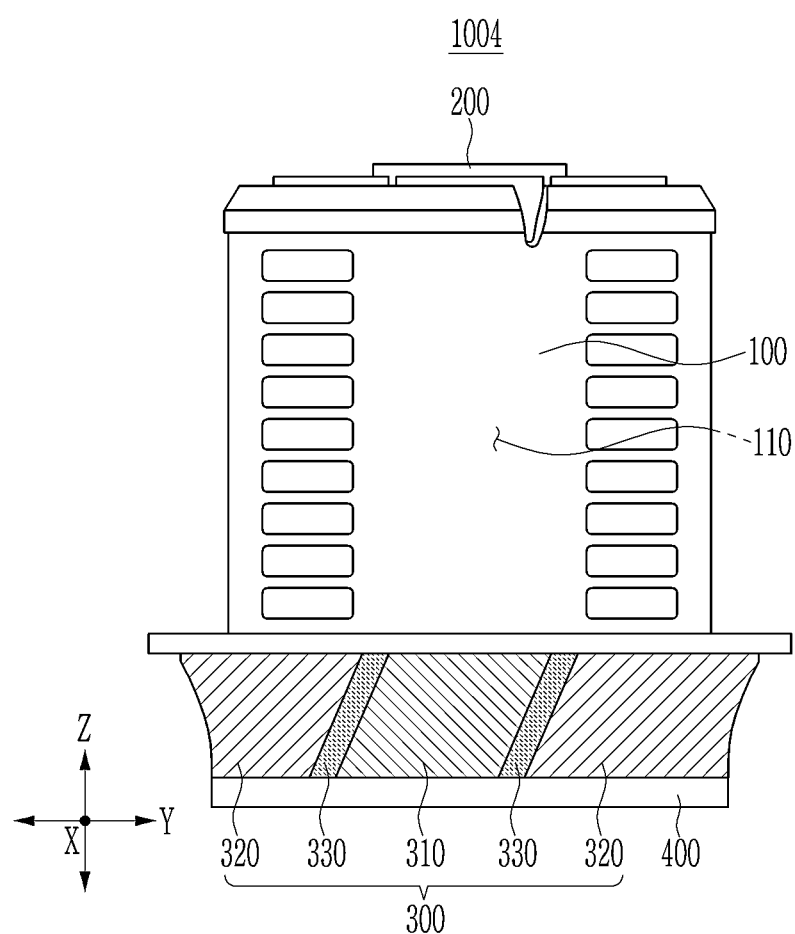
FIG. 8 is a side view illustrating a CTBA bushing according to a fourth embodiment.

FIG. 8 is a side view illustrating the CTBA bushing according to the fourth embodiment.

Referring to FIG. 8, a bushing rubber 300 of a CTBA bushing 1004 according to the fourth embodiment includes a first compound 310, second compounds 320, and third compounds 330.

The third compound 330 is positioned between the first compound 310 and the second compound 320. The third compound 330 is made by mixing the first compound 310 and the second compound 320. The third compound 330 is disposed between the first compound 310 and the second compound 320 and integrated with the first compound 310 and the second compound 320. The third compound 330 may be made of a mixture made by mixing the first compound 310 and the second compound 320 and include publicly-known various types of rubber. The third compound 330 may have a hardness set between the hardness of the first compound 310 and the hardness of the second compound 320. The third compound 330 extends while being inclined rightward with respect to the third direction Z that intersects the first direction X and the second direction Y. The direction of hardness and elastic restoring force of the third compound 330 is adjusted by adjusting a direction in which the third compound 330 extends between the first compound 310 and the second compound 320. The direction of hardness and elastic restoring force of the third compound 330 is adjusted to the third direction Z by adjusting the direction in which the third compound 330 extends between the first compound 310 and the second compound 320, and thus the CTBA bushing in the CTBA suspension system provides an elastic restoring force optimally adjusted in the third direction Z which is the leftward/rightward direction of the vehicle, thereby improving the R&H performance of the vehicle.

A lower plate of a single mold having a shape of the bushing rubber includes a protruding portion of a rightward structure, such that the third compound 330 may extend while being inclined rightward in the third direction Z while corresponding to the lower plate of the mold when the first rubber material of the first compound 310 and the second rubber material of the second compound 320 are mixed.

As described above, the present disclosure provides the CTBA bushing 1004 that optimally copes with the behavior characteristics in the upward/downward direction, the forward/rearward direction, and the leftward/rightward direction of the vehicle.

Figure 9:
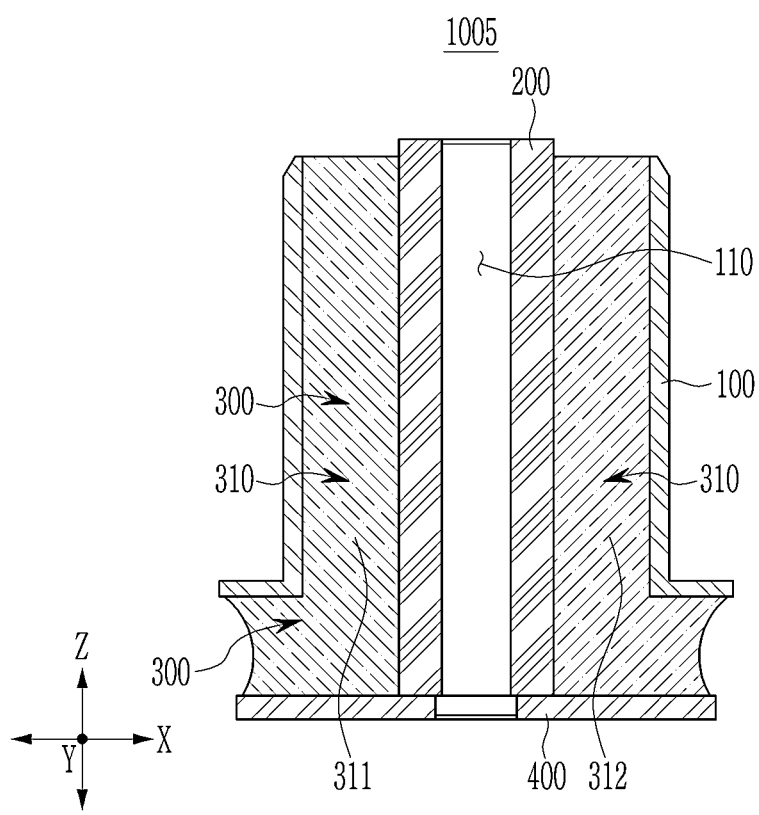
FIG. 9 is a longitudinal sectional view illustrating a CTBA bushing according to a fifth embodiment.

FIG. 9 is a longitudinal sectional view illustrating the CTBA bushing according to the fifth embodiment.

Referring to FIG. 9, a first compound 310 of a bushing rubber 300 of a CTBA bushing 1005 according to the fifth embodiment includes a first sub-compound 311 and a second sub-compound 312 spaced apart from each other with the inner pipe 200 interposed therebetween.

A hardness of the first sub-compound 311 is different from a hardness of the second sub-compound 312. For example, the hardness of the first sub-compound 311 may be set to be higher than the hardness of the second sub-compound 312, but the present disclosure is not limited thereto.

Meanwhile, in another embodiment, any one of the first sub-compound 311 and the second sub-compound 312 may have at least one of higher elasticity, higher durability, and higher heat resistance than the other compound.

Since the hardness of the first sub-compound 311 included in the first compound 310 is different from the hardness of the second sub-compound 312, the CTBA bushing in the CTBA suspension system provides different elastic restoring forces in upward and downward directions of the first direction X which is the upward/downward direction of the vehicle, thereby improving the NVH performance of the vehicle.

In other words, the present disclosure provides the CTBA bushing 1005 that optimally copes with the behavior characteristics of the vehicle in the upward/downward direction, the forward/rearward direction, and the leftward/rightward direction of the vehicle.

Figure 10:
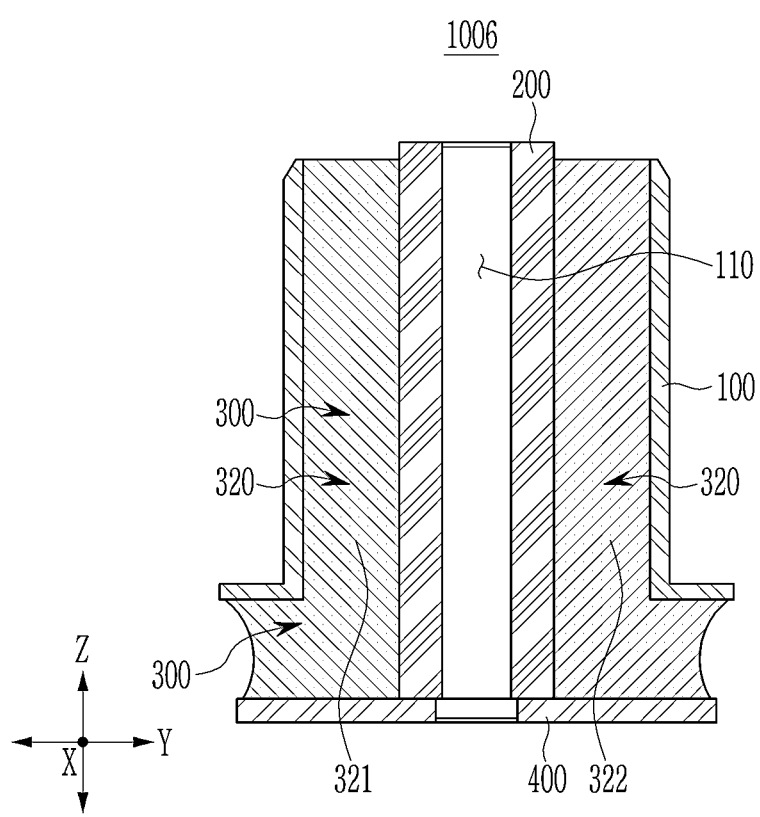
FIG. 10 is a longitudinal sectional view illustrating a CTBA bushing according to a sixth embodiment.

FIG. 10 is a longitudinal sectional view illustrating the CTBA bushing according to the sixth embodiment.

Referring to FIG. 10, a second compound 320 of a bushing rubber 300 of a CTBA bushing 1006 according to the sixth embodiment includes a third sub-compound 321 and a fourth sub-compound 322 spaced apart from each other with the inner pipe 200 interposed therebetween.

A hardness of the third sub-compound 321 is different from a hardness of the fourth sub-compound 322. For example, the hardness of the third sub-compound 321 may be set to be higher than the hardness of the fourth sub-compound 322, but the present disclosure is not limited thereto.

Meanwhile, in another embodiment, any one of the third sub-compound 321 and the fourth compound 322 may have at least one of higher elasticity, higher durability, and higher heat resistance than the other compound.

Since the hardness of the third sub-compound 321 included in the second compound 320 is different from the hardness of the fourth sub-compound 322, the CTBA bushing in the CTBA suspension system provides different elastic restoring force in forward and rearward directions in the second direction Y which is the forward/rearward direction of the vehicle, thereby improving the ride quality performance of the vehicle.

In other words, the present disclosure provides the CTBA bushing 1006 that optimally copes with the behavior characteristics of the vehicle in the upward/downward direction, the forward/rearward direction, and the leftward/rightward direction of the vehicle.

Although the embodiments of the present disclosure have been described in detail above, the right scope of the present disclosure is not limited thereto, and it should be clearly understood that many variations and modifications made by those of having ordinary skill in the art using the basic concept of the present disclosure should also belong to the right scope of the present disclosure.

DESCRIPTION OF SYMBOLS

Outer pipe 100, Inner pipe 200, Bushing rubber 300, First compound 310, Second compound 320

What is claimed is:

1. A coupled torsion beam axle (CTBA) bushing, which is press-fitted into a bushing bracket provided at a tip of a trailing arm at each of two opposite sides of a CTBA suspension system, the CTBA bushing comprising:
   an outer pipe including a through-hole formed therein;
   an inner pipe positioned in the through-hole; and
   a bushing rubber disposed in the through-hole and positioned between an outer peripheral surface of the inner pipe and an inner peripheral surface of the outer pipe,
   wherein the bushing rubber comprises:
   a first compound extending in a first direction, which is an upward-downward direction of a vehicle; and
   a second compound extending in a second direction, which is perpendicular to the first direction, wherein the first compound and the second compound are integrated and form the bushing rubber as a single unit.

2. The CTBA bushing of claim 1, wherein:
   the bushing rubber further includes a third compound positioned between the first compound and the second compound and made by mixing the first compound and the second compound.

3. The CTBA bushing of claim 2, wherein:
   the third compound is integrated with the first compound and the second compound.

4. The CTBA bushing of claim 2, wherein:
   the third compound extends in a direction perpendicular to a direction that intersects the first direction and the second direction.

5. The CTBA bushing of claim 2, wherein:
   the third compound extends helically with respect to a direction that intersects the first direction and the second direction.

6. The CTBA bushing of claim 2, wherein:
   the third compound extends while being inclined leftward with respect to a direction that intersects the first direction and the second direction.

7. The CTBA bushing of claim 2, wherein:
   the third compound extends while being inclined rightward with respect to a direction that intersects the first direction and the second direction.

8. The CTBA bushing of claim 1, wherein:
   the first compound has a hardness less than a hardness of the second compound.

9. The CTBA bushing of claim 1, wherein:
   the first compound and the second compound form a cruciform pattern in the inner pipe.

10. The CTBA bushing of claim 1, wherein:
    the first compound comprises a first sub-compound and a second sub-compound spaced apart from each other.

11. The CTBA bushing of claim 10, wherein:
    a hardness of the first sub-compound is different from a hardness of the second sub-compound.

12. The CTBA bushing of claim 10, wherein:
    the second compound comprises a third sub-compound and a fourth sub-compound spaced apart from each other with the inner pipe interposed therebetween.

13. The CTBA bushing of claim 12, wherein:
    a hardness of the third sub-compound is different from a hardness of the fourth sub-compound.

14. The CTBA bushing of claim 1, further comprising:
    a side stopper positioned at one end of the bushing rubber, wherein one end of the bushing rubber is exposed to an outside of the outer pipe.

* * * * *